May 13, 1941.  A. BROWN ET AL  2,241,899
ELECTRIC REMOTE INDICATING SYSTEM
Filed April 29, 1938   4 Sheets-Sheet 1

INVENTORS
A. BROWN
E. E. M. WOODWARD
BY
ATTORNEY

Patented May 13, 1941

2,241,899

UNITED STATES PATENT OFFICE 2,241,899

ELECTRIC REMOTE INDICATING SYSTEM

Andrew Brown and Edward Egerton Mabbott Woodward, London, England, assignors to International Standard Electric Corporation, New York, N. Y.

Application April 29, 1938, Serial No. 204,970 In Great Britain May 7, 1937

2 Claims. (Cl. 177—353)

This invention relates to electric remote indicating systems, and more particularly, though not exclusively, to centralized traffic indicating systems for railways.

The object of the invention is to provide facilities whereby indications from one or more equipment substations, normally given at one indicating station, may be transferred to another indicating station.

The main feature of the invention comprises an electric remote indicating system comprising a party-line signal channel, a number of substations connected to the channel, a plurality of indicating stations connected to the channel, and switching means for varying the distribution of the indications from the substations among the indicating stations.

According to a second feature of the invention an electric remote indicating system comprises a party-line signal channel, a plurality of groups of equipment substations connected to the channel, a first indicating station connected to one end of the channel, one or more other indicating stations each connected to the channel, groups of indicators at said first indicating station, the number of groups of indicators being equal to the number of groups of equipment substations, one or more groups of indicators at each other indicating station, and switching means for varying the distribution of the indications from the substation groups among the indicating stations.

The invention will be understood from the following description of one embodiment shown in the accompanying drawings, which illustrate a centralized railway traffic indication system for two groups of track sections, the occupied or unoccupied condition of each track section being determined by the position of its track relay contacts.

In the drawings:

Figs. 1, 1A–1C, inclusive, when placed side by side in order show the complete wiring diagram of a system in accordance with our invention.

In each of these figures the various leads which terminate on battery are shown connected to an upper or positive line, or to a lower or negative line instead of showing separate battery sources. It is clear, of course, that separate positive and negative supply sources will in general be arranged locally at the various stations.

The present invention may also be applied to other systems such as either of the systems described in British patent specification No. 461,136.

Figure 1A:
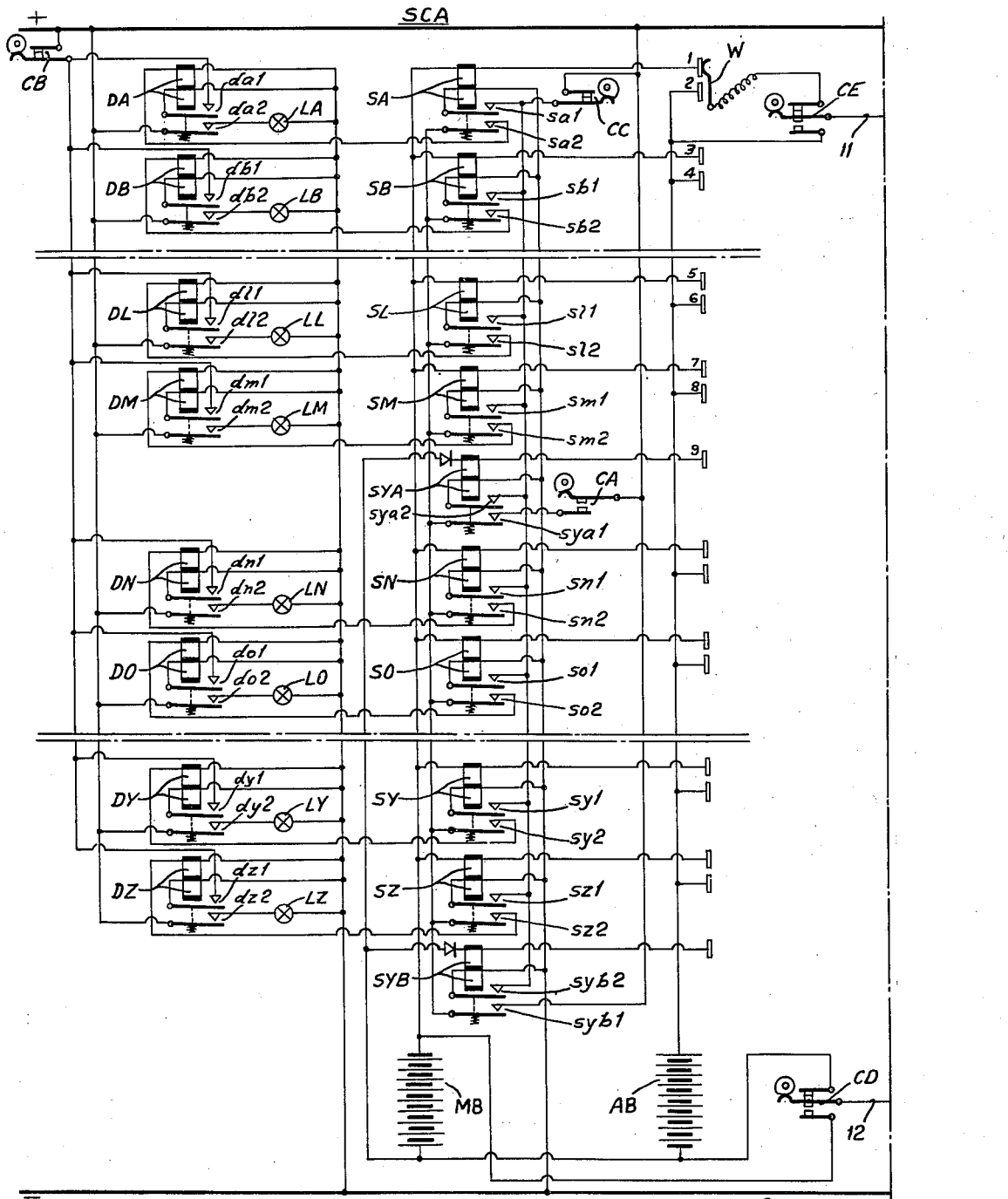
Fig. 1A shows the indictor equipment at one signal cabin SCA, for controlling all of the signals or only the first group of signals.
Figure 1B:
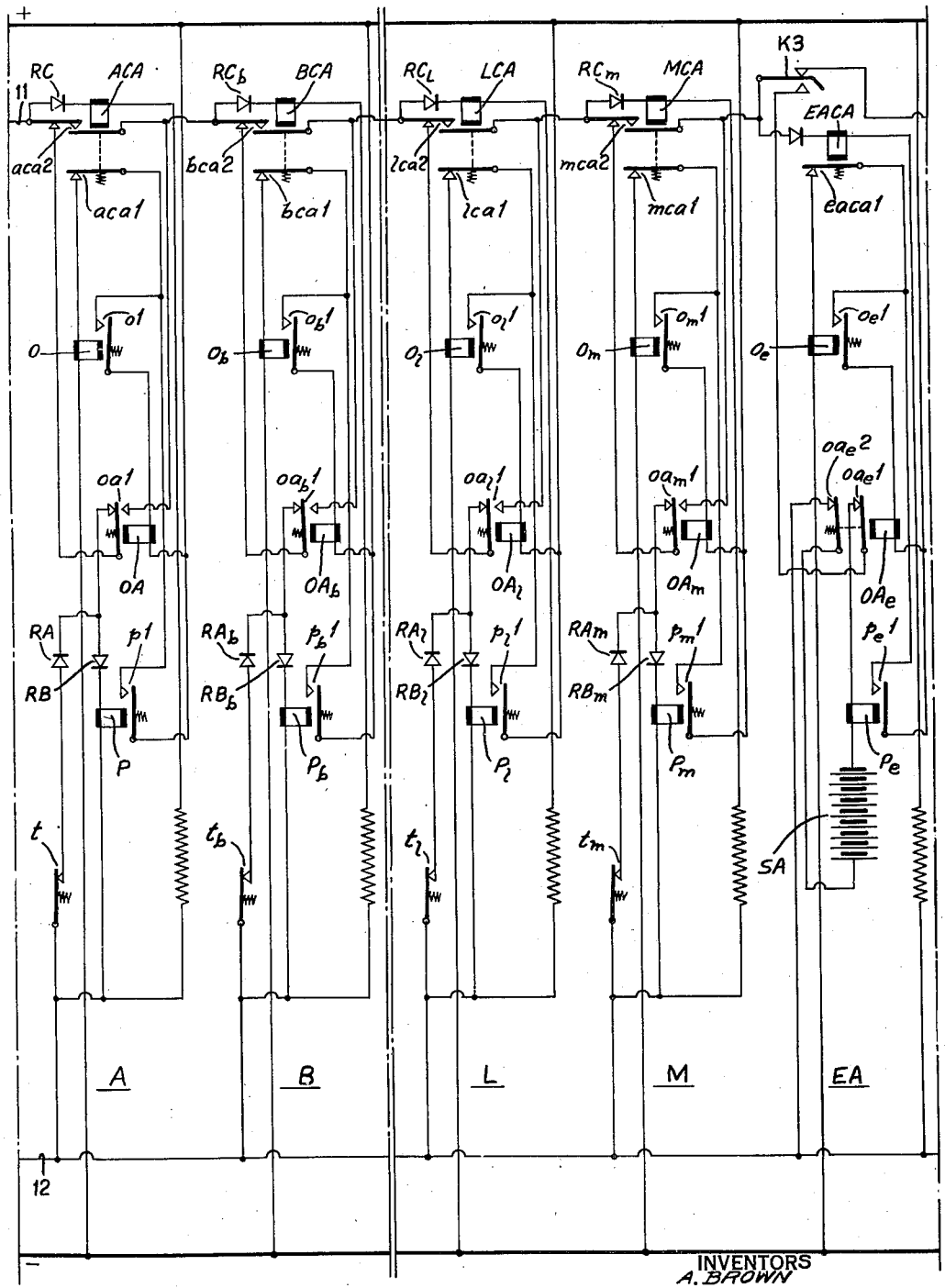
Fig. 1B shows the signal or substation equipment provided at each of the first group of track sections A, B, L, M, and the check signal or synchronizing station EA for this first group, which is preferably at the location of station SCB.
Figure 1C:
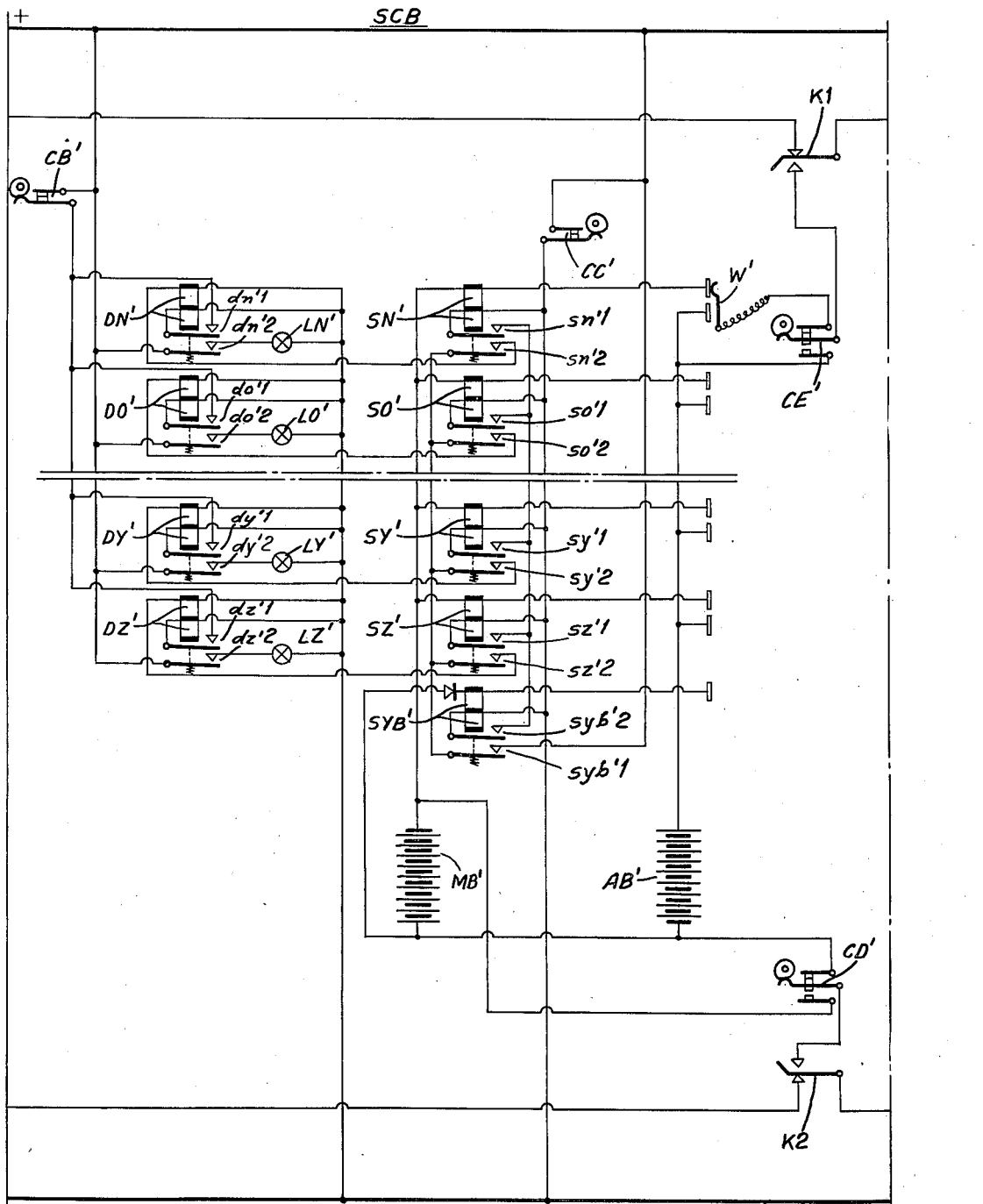
Fig. 1C shows the indicator equipment at the second signal SCB, for the succeeding group of signal or substation equipment.

Cabin SCA is always attended and a key having contacts $K_1$, $K_2$, $K_3$, is provided at signal cabin SCB, Figs. 1B and 1C, for switching the part of the signal channel to which the second group of substations is connected from SCB to the preceding portion of the channel and vice versa, according as the cabin SCB is to be unoccupied or occupied.

SCA normally supervises the group of track sections A—M between itself and the second signal cabin SCB, and also the succeeding group of track sections N—Z beyond cabin SCB, which is normally unattended. Under these circumstances the intermediate signal cabin SCB is switched out and cabin SCA receives the indications from both groups of track sections.

The sequence of the operations when the equipment is in this condition is as follows: The system is under the control of a master distributor switch situated in cabin SCA, Fig. 1A. This distributor is revolving continuously and during each revolution carries a wiper W over a number of bank contacts 1, 2 . . . In addition, a number of cam contacts, CA, CB, CC and CD, are operated at specified points in the revolution of the distributor.

When the wiper reaches No. 1, bank contact current is fed from the negative pole of the main battery MB through the winding SA, wiper W, cam contacts CE, over line 11 to the first substation A, Fig. 1B, via contacts $aca2$, $oa1$, rectifier RA, contact $t$ of the track relay, assuming that the track is clear, over line 12 to the signal cabin, contact of cam CD to positive battery MB.

It will be seen that current flows over this circuit to operate relay SA only if the first track relay is in the "clear" position. If operated, relay SA locks over the circuit +, contacts of cam CC, $sa1$, —.

When the wiper moves on to contact 2 current flows from the positive pole of an auxiliary battery AB through wiper W, cam CE, line 11, aca2, oa1, rectifier RB, relay P, line 12, cam CD, to the negative pole of the auxiliary battery.

Relay P, Fig. 1B, is operated, whether SA has operated or not, and operates relay O in a local circuit, +, p1, aca1, winding of O, —.

Contacts o1 prepare the circuit for relay OA, which does not immediately operate since positive battery potential is applied to both ends of its winding.

When wiper W leaves contact No 2, relay P will be released and relay OA will then operate in series with relay O, which remains operated, +, winding of OA, o1, aca1, winding of O, —. The operation of contacts oa1 transfers line 11 from substation A through to substation B, which is exactly similar to A, line 11, aca2, oa1. Only four sections A, B, L and M are illustrated, but it should be understood that as many sections as desired may be provided. In these sections corresponding parts have been designated by similar reference characters, these being distinguished by substitution of the letter designating the track section for the CA relays and their contacts, and by the lower case letter used as a subscript in the other parts of the circuit. Relay SB is operated and locked if track B is clear, in the same manner as was relay SA, and thereafter relays Pb, Ob and OAb of track B will be operated to carry the line through the track sections to track M in turn.

When wiper W reaches the bank contact 9 connected to relay SYA, the lines will have been connected through as far as the synchronising station EA, to the right of Fig. 1B, which ends the first group of substations.

Since the control cabin SCB is switched out with K3 in the upper position, the lines by-pass the synchronising station EA and the control station SCB, Fig. 1C, so that they are connected to the first track substation N beyond cabin SCB. The relay SYA is short-circuited via the loop at said track location, + at MB, winding of SYA, wiper W, first track group ca2 contacts, nca2, oan1, RAn, tn, l12 to + at NB, and therefore cannot operate and the wiper passes to the contact associated with relay SN. Relay SN operates via the loop at location N if the track section is clear, in the same manner as specifically described in connection with the A section, and the lines are switched through to test the condition of subsequent track sections as described above.

Figure 1D:
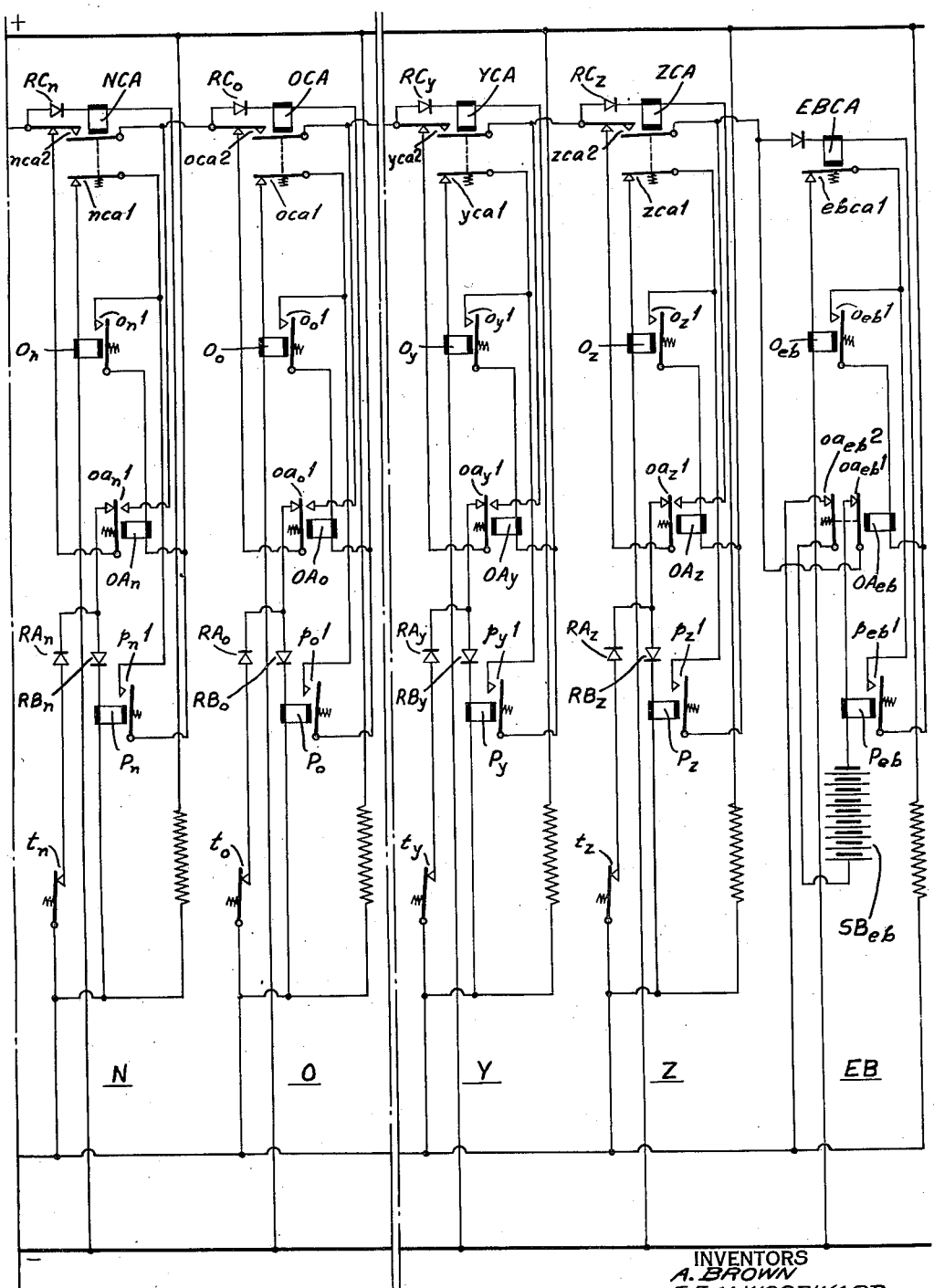
Fig. 1D shows the signal or substation equipment at track sections N, O, Y and Z, and the check back or synchronizing station EB for the second group.

When the wiper reaches the bank contact connected to relay SYB, the lines will have been connected through to synchronising station EB, Fig. 1D, at the end of the second group of track substations, provided that the transference of the lines from substation to substation has been correctly carried out. Relay SYB operates in series with relay Peb and battery SB at synchronising station EB, + at MB, winding SYB, wiper W, line 11, all ca2 contacts in series, oaeb1, winding of Peb, — at SB, oaeb2, to line 12.

It should be noted that in the event of the line switching function not having operated sufficiently often, the wiper would reach relay SYB before the synchronising battery was available on the line. If, on the other hand, the line switching function occurred too often, then relay Peb at the synchronising station would operate in series with one of the previous S relays, consequently operating relays Oeb and OAeb and removing the synchronising battery from the line at oaeb1 and oaeb2 before the wiper reached relay SYB.

The operation of relay SYB can, therefore, be accepted as a complete proof that all track locations connected to the signal channel have been tested correctly.

Both groups of S relays have now been selectively operated and locked in accordance with the state of the track. The operation of contacts syb1 brings up corresponding relays of a group DA—DZ over +, syb1, contacts sa2, sb2, etc., winding of DA—DZ to —.

During the time that relay SYB is operated, cam CB breaks the locking circuit to all D relays, releasing any D relays which were operated on a previous cycle, but which are no longer required.

Cam CB re-closes and restores the locking circuit to the new selection of D relays over their contacts da1—dz1 before the release of relay SYB removes their operating circuits. Cam CC then opens for a short time, unlocking all the S relays and so restoring them to the "track occupied" condition in preparation for the next cycle.

Cams CD and CE now operate simultaneously to close the lower contacts, connecting the main and auxiliary batteries MB, AB in series across the lines 11 and 12. The 100 volt battery causes sufficient current to flow to operate all the CA relays, ACA, BCA, etc. in parallel at the track substations.

Each CA relay unlocks the corresponding O and OA relays so re-connecting the lines to track substation A. The contacts aca2 at each track substation preserve the booster battery impulse to all stations even after some of the OA relays have released, and at the same time the break contacts of aca2 prevent the P relays from placing a shunt across the lines at stations where the OA relays have released. This clearing impulse is maintained for a sufficient time to ensure that all substations are restored to normal when the equipment is ready for commencing a new cycle.

During the testing time of the next cycle, the indication which was picked up in the previous cycle is displayed over contacts of the D relays on lamp LA, LB, etc.

Consider now the case when the intermediate signal cabin SCB is switched in by means of a manual switching key having contacts K1, K2, K3. A distributor similar to that described above is situated in cabin SCB, Fig. 1C, and the lines beyond are connected to this distributor over contacts K1, K2 of the cabin switching key. It will be obvious that the substations N, O, etc., Fig. 1D connected to the signalling channel beyond SCB will be tested in turn by the cabin SCB in a manner similar to that previously described for cabin SCA. The SN and DN relays and their circuits are similar to those shown in Fig. 1A and are designated by similar reference characters distinguished by a prime marking.

The distributor in cabin SCA will now test track substations A, B, L, M, etc., of the first group of substations only until it reaches the synchronising station EA which has been brought into operation by contacts K3 of the same key that introduced signal cabin SCB. The operation over relay SYA is then similar to that previously described in connection with SYB. If the key which inserted the cabin SCB is returned to its unoperated position and a key at a third cabin (not shown) beyond SCB is connected to the signalling channel, then the cabin SCA will test track substations of the first two groups of substations, i. e. the substations between SCA and the third cabin.

When the wiper W in SCA reaches relay SYA, this relay will be operated in series with relay P and the 50 volt battery at synchronising station EA, and locked over contacts of cam CC.

As the distributor proceeds over the cycle no further S relays will be operated since the line is now open-circuited at synchronising station EA by contacts $oa1$. For the same reason relay SYB will not be operated.

During the time that the distributor is testing for the operation of relay SYB, contacts of cam CA will be closed and a group of D relays, corresponding to the S relays already operated, will be energised over contacts of cam CA and SYA, which relay is locked up if the synchronising of the first group of track substations was proved correct.

While cam CA is still operated, contacts of cam CB break the locking circuit for the D relays which are no longer required. After this lock circuit is restored, contacts of cam CA again open. The S relays will later be unlocked by cam CC and the clear down impulse sent out over cams CD and CE as described above.

If SYA or SYB—according as the intermediate cabin is not in use or does not operate, the operating circuits for relays DA—DZ will not be completed when cam CA closes. Since cam CB opens the locking circuits of all these relays, there will be no relays energised indicating to the signalman that the equipment is out of order.

It will be understood that three or more cabins or indicating stations may be provided. Thus in railway practice it is becoming more and more frequent to have cabins attended at intervals only. For instance, main cabins 20 or 30 miles apart may be continuously attended, and several intermediate cabins may be in use for part of the 24 hours only. Considering traffic on the down track, between the main cabins, the main cabin at the exit end, and each intermediate cabin will have indicating equipment for all groups of track sections between itself and the main cabin at the incoming end. This equipment will be split up into groups separated by check relays such as SYA, SYB, and the number of groups in use will depend on the number of intermediate cabins in use at the same time.

For traffic on the up track, a separate signal channel will be provided, connected to separate indicator equipment in each intermediate cabin and indicator equipment at the other main cabin; the up track section substations will be connected to this channel together with synchronising stations.

What is claimed is:

1. In a remote indicating system, a signalling channel, a plurality of substations associated with said channel at different points thereof, an indicating station associated with said channel at one end thereof, said substations having devices thereat whose condition is to be indicated at the indicating station, means at the indicating station operated from the last substation and an intermediate substation for sequentially testing the condition of said devices and indicating the condition thereof, another indicating station beyond said intermediate substation having testing and indicating means similar to that of the first indicating station for the substations beyond said second indicating station, switching means at said second indicating station for either rendering the testing and indicating means at said second station effective for the substations therebeyond and rendering the testing and indicating means of said first indicating station ineffective for the stations beyond said second station, or for rendering said testing and indicating means at said first station effective for all the stations and the testing and indicating means at said second station ineffective.

2. In a remote indicating system, a signaling channel, a plurality of substations associated with said channel at different points thereof, an indicating station associated with the channel at one end thereof, said substations having devices thereat whose condition is to be indicated at the indicating station and said indicating station having provisions for successively rendering the substations effective to transmit their condition indications over said channel to said indicating station and for successively receiving said indications, means at the indicating station operated from the last substation and an intermediate substation for checking the synchronous successive operation of the substations and the successive operation of the receiving means at the indicating station for rendering the received indications effective if synchronism obtains, another indicating station beyond the intermediate substation having provisions and checking means similar to that of the first indicating station for the substations beyond the second indicating station, switching means at the second indicating station for either rendering the provisions and checking means at the second station effective for the stations beyond and rendering the provisions at the first station ineffective with respect to the stations beyond and for rendering the checking means at the first indicating station effective for the synchronous operation up to the intermediate substation or for rendering the provisions and checking means of the first indicating station effective for all of the stations.

ANDREW BROWN.
EDWARD EGERTON
MABBOTT WOODWARD.